(12) United States Patent  (10) Patent No.: US 8,087,625 B2
Chang  (45) Date of Patent: Jan. 3, 2012

(54) ARTICLE HOLDER WITH SUCTION CUP

(76) Inventor: Ta Shuo Chang, Taipei (TW)

( * ) Notice: Subject to any disclaimer, the term of this patent is extended or adjusted under 35 U.S.C. 154(b) by 784 days.

(21) Appl. No.: 12/207,768

(22) Filed: Sep. 10, 2008

(65) Prior Publication Data

US 2009/0308993 A1  Dec. 17, 2009

(30) Foreign Application Priority Data

Jun. 17, 2008  (TW) .............................. 97210712 U

(51) Int. Cl.
*A45D 42/14* (2006.01)
(52) U.S. Cl. ................. 248/205.5; 248/205.8; 248/206.2
(58) Field of Classification Search ............... 248/205.5, 248/205.6, 205.8, 205.9, 206.2, 683
See application file for complete search history.

(56) References Cited

U.S. PATENT DOCUMENTS

| | | | |
|---|---|---|---|
| 6,966,530 B2 * | 11/2005 | Hsu | 248/206.2 |
| 7,092,521 B2 | 8/2006 | Wang | |
| 7,387,284 B2 * | 6/2008 | Chang | 248/206.5 |
| 7,661,648 B2 * | 2/2010 | Lin | 248/683 |
| 7,712,720 B1 * | 5/2010 | Cheng et al. | 248/346.07 |
| 7,913,963 B2 * | 3/2011 | Cheng et al. | 248/205.5 |
| 7,967,262 B2 * | 6/2011 | O'Brien et al. | 248/205.5 |

* cited by examiner

*Primary Examiner* — Amy J Sterling
(74) *Attorney, Agent, or Firm* — Muncy, Geissler, Olds & Lowe, PLLC

(57) ABSTRACT

A holder includes a suction cup comprising a circular plate formed of resilient material and a rigid bell wherein the plate includes a central coupling member including outer threads, and the bell includes a hollow cylinder including two opposite openings with the outer threads disposed thereat; a manipulation assembly comprising a tube including an internal threaded section threadedly secured to the outer threads, a sleeve securely put on the tube, and a coupling mechanism seated upon the sleeve; and a pivot assembly comprising a pivot mechanism pivotably secured to the coupling mechanism, an arm extended upward from the pivot mechanism, and a seat assembly rotatably, pivotably secured to the arm. Preferably, the holder is adapted to hold an article (e.g., mobile phone) when it is immovably and captively retained on a dashboard of a motor vehicle.

6 Claims, 12 Drawing Sheets

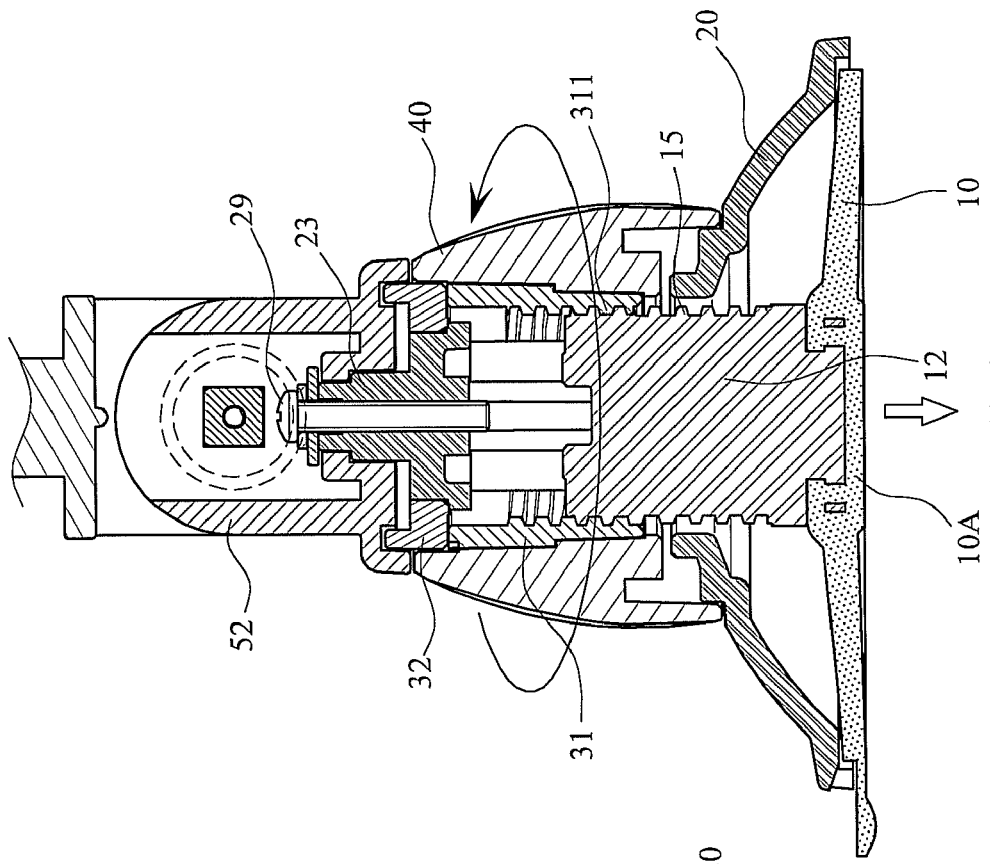
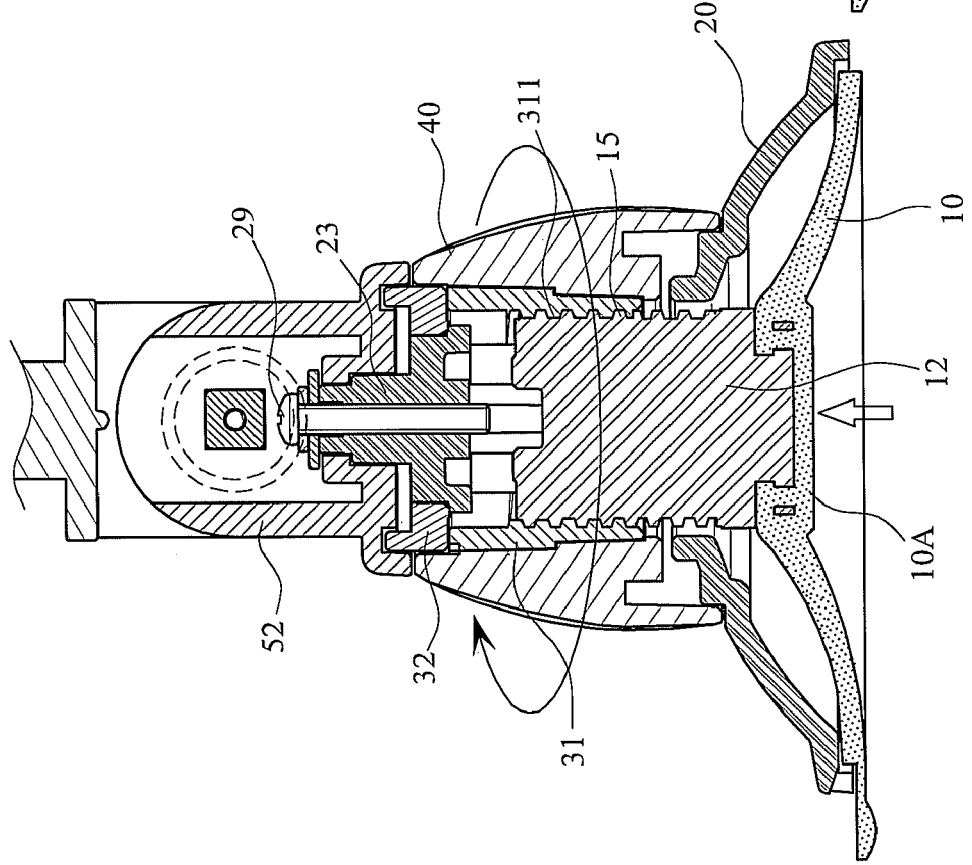

ARTICLE HOLDER WITH SUCTION CUP

BACKGROUND OF THE INVENTION

1. Field of Invention

The invention relates to article holders and more particularly to an improved article holder having a suction cup to be mounted on, for example, a dashboard of a motor vehicle.

2. Description of Related Art

Holders with suction cup to be releasably mounted on a flat surface are well known in the art. Nowadays many types of hands-free devices are commercially available for use in motor vehicle. These devices function as a holder for retaining, for example, a mobile phone or PDA (Personal Digital Assistant), so that a driver may use the mobile phone or PDA while driving.

There have been numerous suggestions in prior patents for article holder having a suction cup. For example, U.S. Pat. No. 7,092,521 discloses a fixed base assembly of mobile phone. But this is unsatisfactory for the purpose for which the invention is concerned for the following reasons: It is not reliable and is not durable. Further, its operation is inconvenient because both hands are required. Thus, the need for improvement still exists.

SUMMARY OF THE INVENTION

It is therefore one object of the invention to provide a robust, durable, and easily operated article holder having a suction-type mounting assembly to be mounted on, for example, a dashboard of a motor vehicle.

The above and other objects, features and advantages of the invention will become apparent from the following detailed description taken with the accompanying drawings.

BRIEF DESCRIPTION OF THE DRAWINGS

FIG. 14 is a fragmentary sectional view of the lower portion of the holder shown in FIG. 5 on a large scale showing a disengagement operation of the holder;

FIG. 15 is a view similar to FIG. 14 showing a mounting operation of the holder;

DETAILED DESCRIPTION OF THE INVENTION

Figure 1:
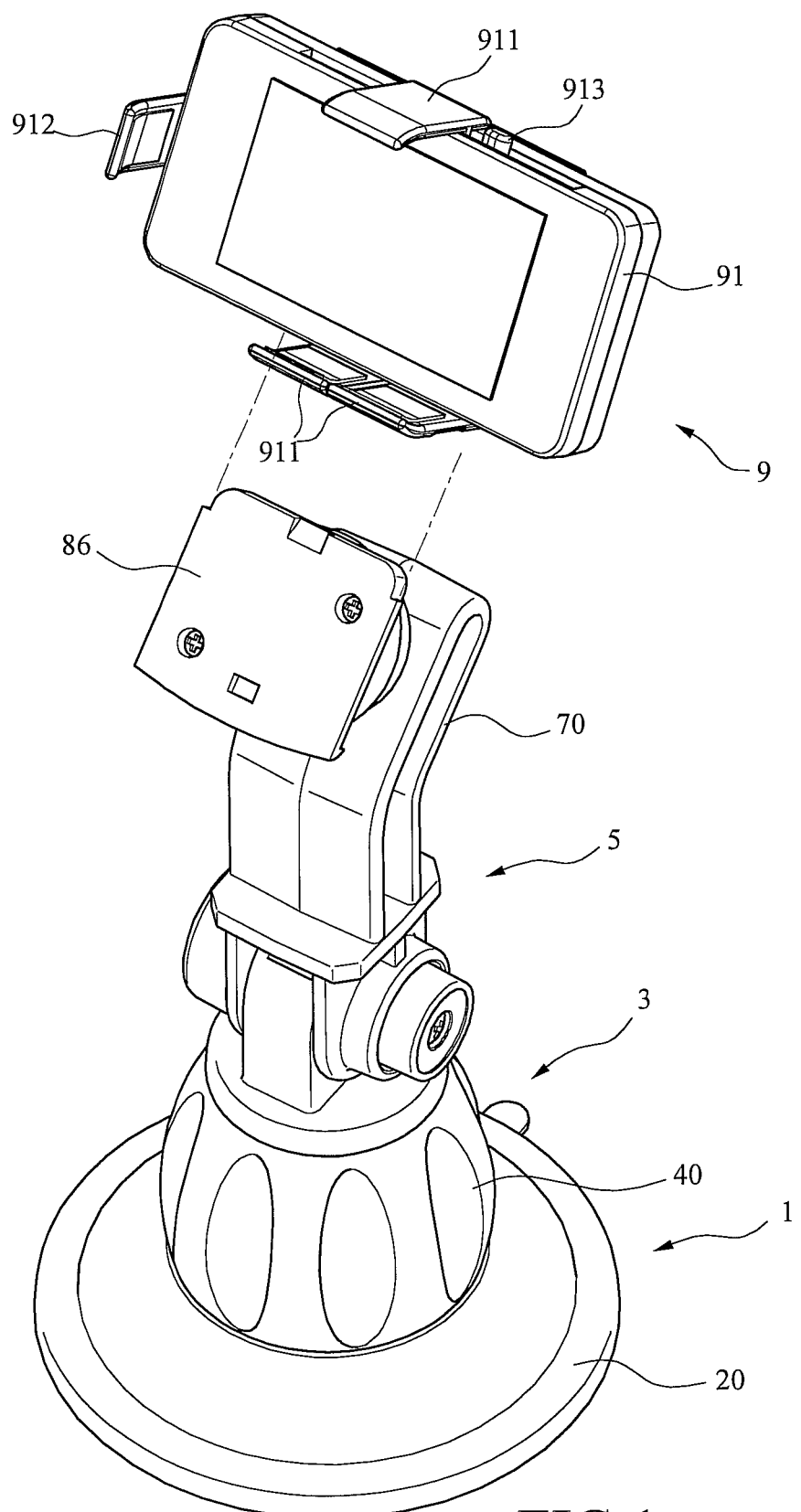
FIG. 1 is an exploded perspective view of a preferred embodiment of article holder for motor vehicles according to the invention.
Figure 2:
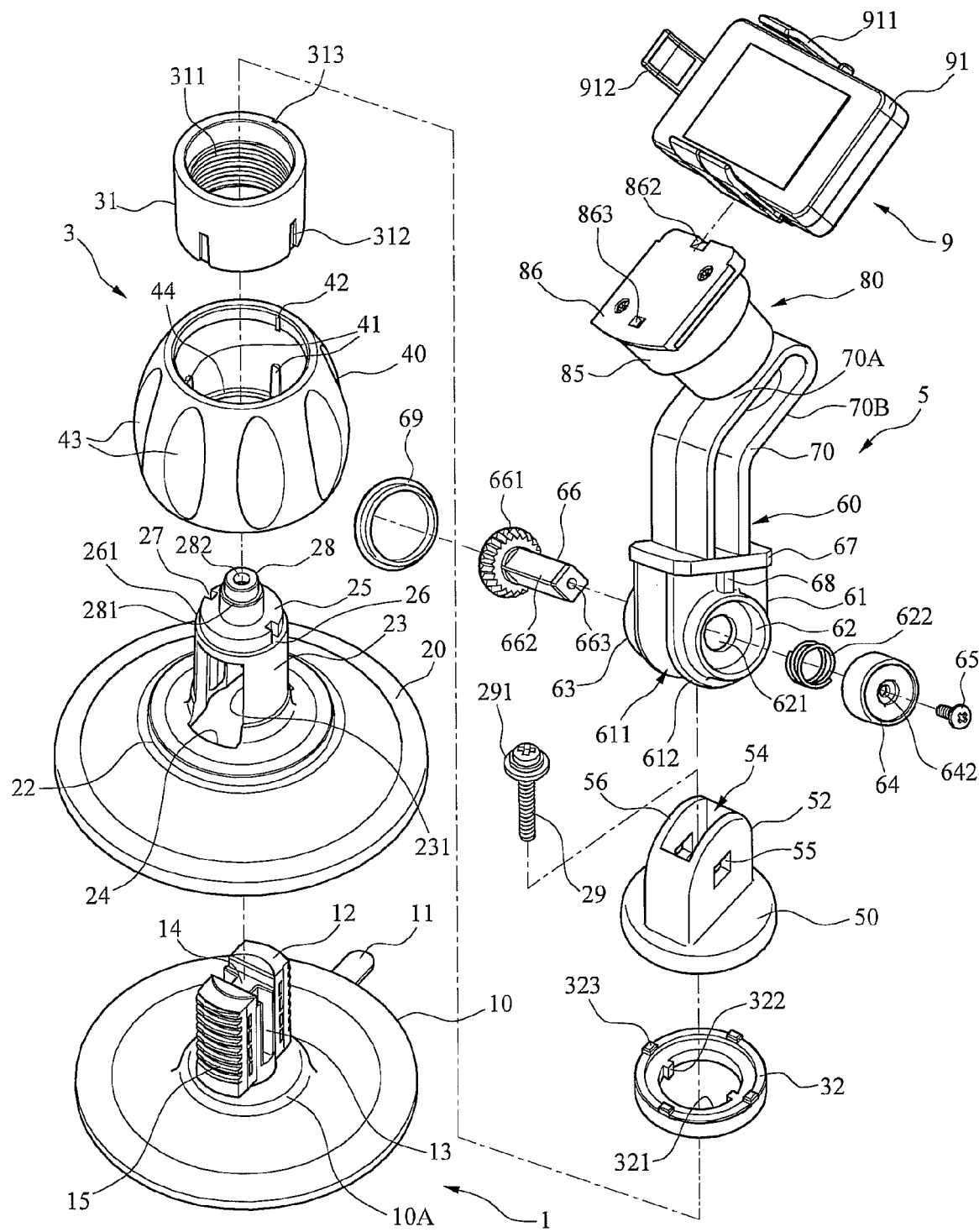
FIG. 2 is an exploded view of the holder.
Figure 3:
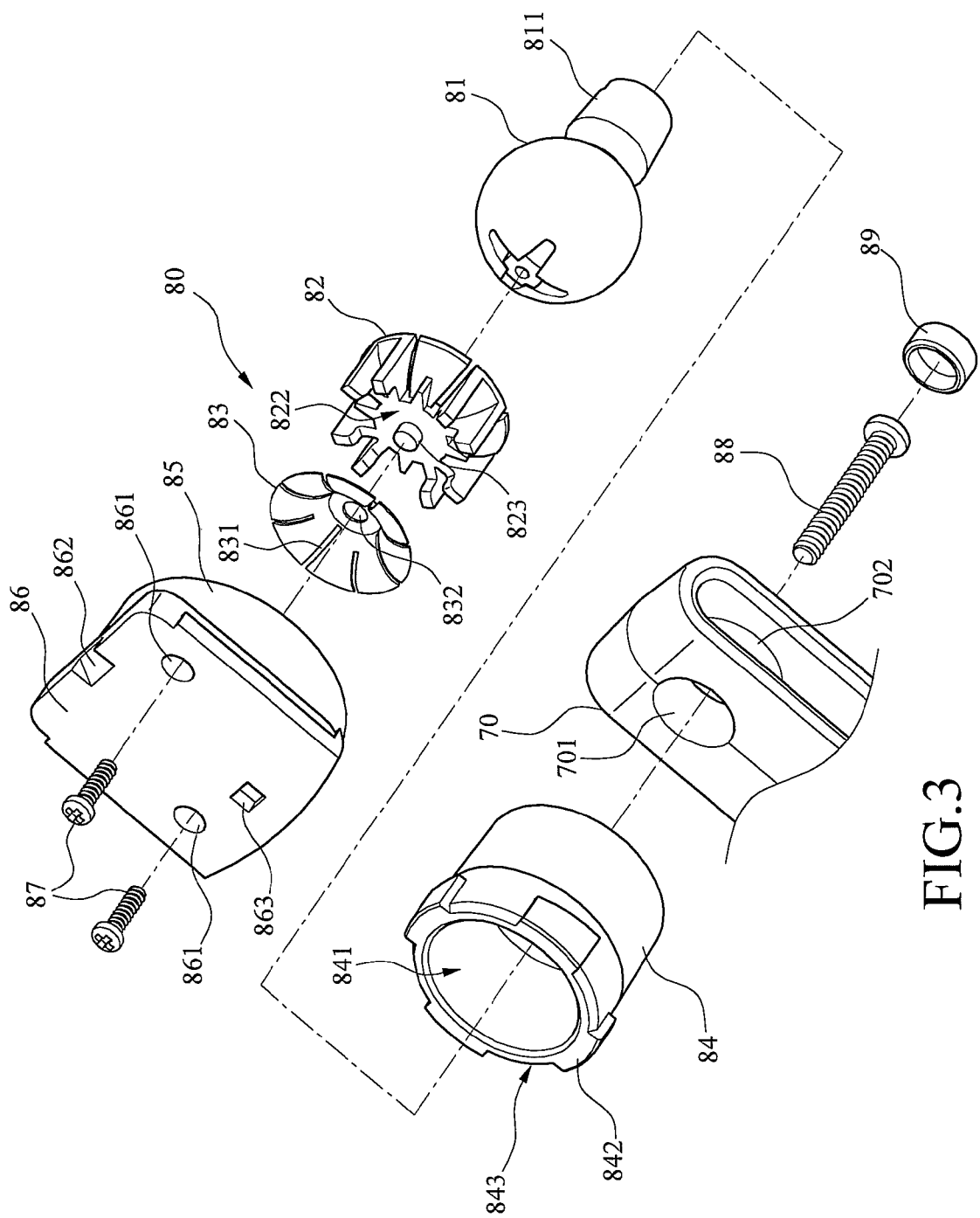
FIG. 3 is an exploded view of the seat assembly.
Figure 4:
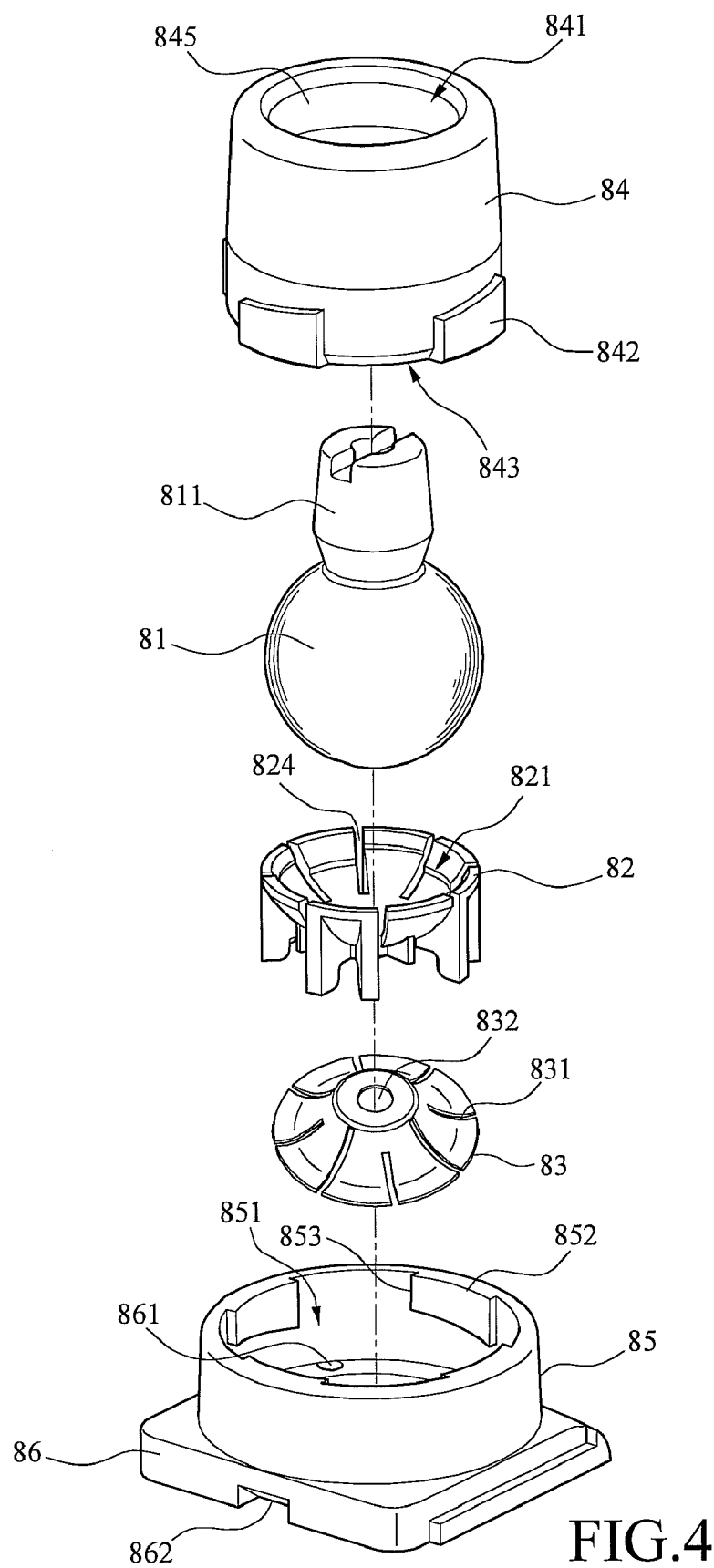
FIG. 4 is another exploded view of certain components of the seat assembly of FIG. 3.
Figure 5:
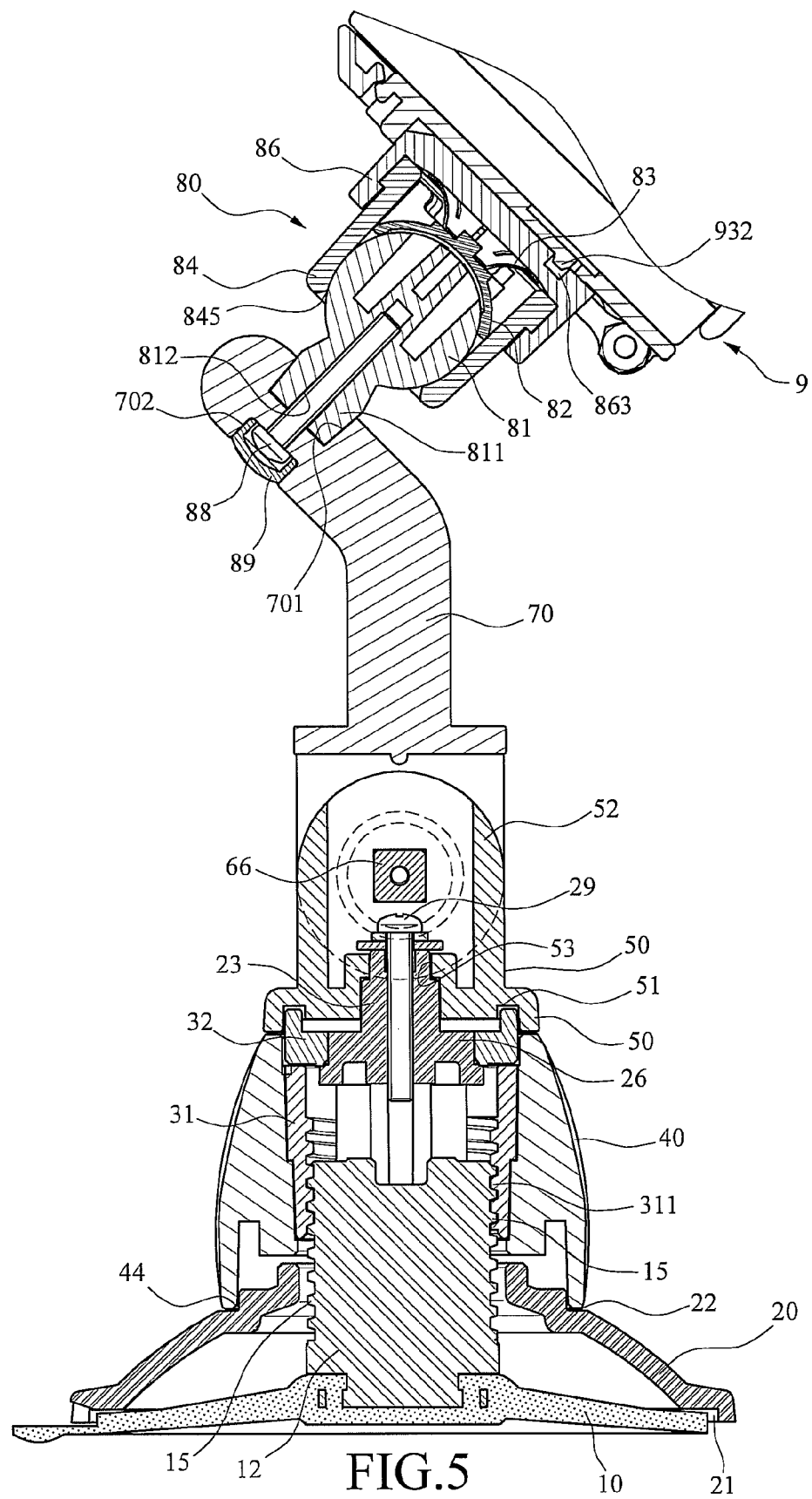
FIG. 5 is a longitudinal sectional view of the holder.

Referring to FIGS. 1 to 19, an article holder in accordance with a preferred embodiment of the invention is shown. The holder is adapted to mount on, for example, a dashboard of a motor vehicle. The holder comprises the following components as discussed in detail below.

A bell-shaped suction cup 1 comprises a circular plate 10 formed of resilient material and a rigid bell 20. The plate 10 comprises a tab 11 projecting out of its periphery, and a rigid coupling member 12 of substantially rectangular section projecting upright out of a raised center 10A, the coupling member 12 including two side grooves 13, a top recess 14, and outer threads 15.

The bell 20 comprises a central opening 24, a peripheral shoulder 21 adapted to urge against the periphery of the plate 10, a hollow cylinder 23 projecting out of the edge of the opening 24, an annular shoulder 22 intermediate the opening 24 and the periphery, two opposite openings 231 with the outer threads 15 disposed thereat, an upper circular platform 25 on the top of the cylinder 23, an annular shoulder 26 between the cylinder 23 and the platform 25, two opposite cuts 27 on the periphery of the platform 25, and a top cylindrical head 28 having an annular intermediate shoulder 281 and an axial threaded hole 282.

The bell 20 is mounted on the plate 10 with the coupling member 12 inserted into the cylinder 23 and the outer threads 15 exposed out of the openings 231.

A manipulation assembly 3 comprises a tube 31 having an internal threaded section 311, a plurality of equally spaced troughs 312 on a lower outer portion, and a longitudinal groove 313 on the outer surface; and a ring 32 including a plurality of (e.g., four) equally spaced top projections 323, two opposite protrusions 322 on the inner surface, and an annular shoulder 321 between the projections 323 and the protrusions 322.

The manipulation assembly 3 further comprises a sleeve 40 including an annular member 44 on the bottom adapted to rest upon the shoulder 22, an upper protuberance 42 adapted to matingly engage with the groove 313, a plurality of equally spaced risers 41 on the inner surface below the protuberance 42, and a plurality of equally spaced oval-shaped indentations 43 on the outer surface for ease of turning.

A circular coupling mechanism 50 comprises a plurality of equally spaced cavities 51 around the bottom surface, a central opening 53, and a hollow coupling member 52 projecting out of the top and having a channel 54 being in communication with the opening 53, two side openings 55 of square section being in communication with the channel 54, and a curved top 56.

The tube 31 is put on the cylinder 23 to threadedly secure the internal threaded section 311 to the outer threads 15. Also, the ring 32 is seated upon the shoulder 26 and is disposed on the tube 31 with the protrusions 322 fitted in the cuts 27. Both the ring 32 and the tube 31 are mounted in the sleeve 40 which is seated upon the shoulder 22. Also, the risers 41 are matingly engaged with the troughs 312 and the protuberance 42 is matingly engage with the groove 313. Hence, the sleeve 40 and the tube 31 can corotate.

The coupling mechanism 50 is seated upon the ring 32 with the cavities 51 being matingly engaged with the projections 323 and the head 28 matingly engaged with the opening 53. A screw 29 is driven into the threaded hole 282 to make the engagements of both the projections 323 and the cavities 51 and the coupling mechanism 50 on the sleeve 40 fastened.

A pivot assembly 5 comprises a pivot mechanism 60 comprising a lower pivot section 61 and an upper arm 70. The pivot section 61 comprises an axial cut 611, a first well 62 on one side, and a second well 63 on the other side. In the first well 62 there is provided a hole 621. In the second well 63 there are provided a hole 632 being in communication with the hole 621 through the cut 611, and an annular toothed section 631. The cut 611 is matingly put on the coupling member 52 with the openings 55 aligned with the holes 621, 632.

A pin-shaped member 66 comprises a shank 662 of square section, an axial threaded hole 663 in the shank 662, and a toothed section 661 around the head. The pin-shaped member 66 is inserted through the hole 632, one side opening 55, the cut 611, the other side opening 55, and the hole 621 to project out of the first well 62 with the toothed section 661 being in mesh with the toothed section 631. A spring 63 is put on the shank 662 of the pin-shaped member 66 exposed in the first well 62. A screw 65 is driven through a push button 64 into the threaded hole 663 to secure the push button 64 to the pin-shaped member 66, make the push button 64 to be spring depressible, and make the shank 662 to be not rotatable relative to the coupling mechanism 50 due to the limiting effect of the side openings 55 of square section. A circular cap 69 is fitted on the second well 63 to conceal the head of the pin-shaped member 66.

A rectangular plate 67 is formed between the pivot section 61 and the arm 70. Tow opposite ribs 68 are formed on the pivot section 61 in which one rib 68 is interconnected the bottom of the plate 67 and the first well 62 and the other rib 68 is interconnected the bottom of the plate 67 and the second well 63. The arm 70 is bent and extends upward out of the plate 67. The arm 70 has an upper first recess 701 on one surface and an opposite upper second recess 702 on the other surface.

A seat assembly 80 comprises the following components. A rotatable ball 81 has a shank-shaped projection 811 matingly disposed in the first recess 701, and an axial threaded hole 812 in the projection 811. A screw 88 is driven through the second recess 702 into the threaded hole 812 for fastening the ball 81. A circular cap 89 is matingly fitted on the second recess 702 to conceal the screw 88. A bowl member 82 has a concave surface 821 adapted to matingly engage with the ball 81, a plurality of slits 824 for dividing the concave surface 821 into a plurality of equal flexible sections, a recessed portion 822 on the surface opposite the concave surface 821, and a central stud 823 on the recessed portion 822.

A cup-shaped member 83 comprises a central hole 832 securely put on the stud 823 and a plurality of slits 831 for dividing the cup-shaped member 83 into a plurality of flexible sections. A hollow cylindrical cage 84 comprises an internal space 841 for rotatably receiving the ball 81, an annular flange 845 of reduced diameter on one end for preventing the ball 81 from removing therefrom, a plurality of (e.g., four) trapezoidal tabs 842 equally spaced around the other end, and a plurality of gaps 843 each formed between two adjacent tabs 842. A cylinder 85 comprises an axial space 851, a plurality of (e.g., four) trapezoidal tabs 852 equally spaced around the inner surface at one end, a plurality of gaps 853 each formed between two adjacent tabs 852, and a plurality of threaded holes 854. The tabs 842 can be lockingly engaged with the tabs 852 by passing the tabs 842 through the gaps 853 and then turning the cage 84 in one direction. As an end, the cage 84 and the cylinder 85 are releasably secured together.

A seat 86 of substantially square comprises an oblique cut 862 on one side, a slot 863 on the surface opposing the cylinder 85, and a plurality of holes 861 so that a plurality of screws 87 are adapted to drive through the holes 861 and the threaded holes 854 into the space 851 for fastening the seat 86 and the cylinder 85 together.

A rectangular mounting assembly 9 comprises the following components. A plate 91 comprises two first sliding grooves 90A on two longer sides, and a second sliding groove 90B on one shorter side. Three first clamping arms 911 are provided in which one first clamping arm 911 is slidably provided in one first sliding groove 90A and the other two first clamping arms 911 are slidably provided in the other first sliding groove 90A. A push button 913 is also provided in the first sliding groove 90A so that a pressing of the push button 913 can extend the first clamping arm 911 out of the first sliding groove 90A to adjust a distance between one first clamping arm 911 and the other two first clamping arms 911 for accommodate different sizes of an article (e.g., a mobile phone) 100 being clamped by the mounting assembly 9. A second clamping arm 912 is slidably provided in the second sliding groove 90B. A U-shaped member 92 has two hinges 921 having a torsion spring (not shown) being hingedly secured to the other longer side of the plate 91. Hence, a user may pivot the U-shaped member 92 about the plate 91 to rest upon a flat surface (e.g., desk) after removing the mounting assembly 9 out of the holder as an independent holder in another application (see FIG. 17).

A positioning member 93 is provided on the surface of the plate 91 with the U-shaped member 92 being surrounded. The positioning member 93 has a recess 931 adapted to releasably engage with the seat 86, and a latch 932 adapted to releasably secure to the slot 863 so that the mounting assembly 9 can be mounted on the seat 86.

Figure 7:
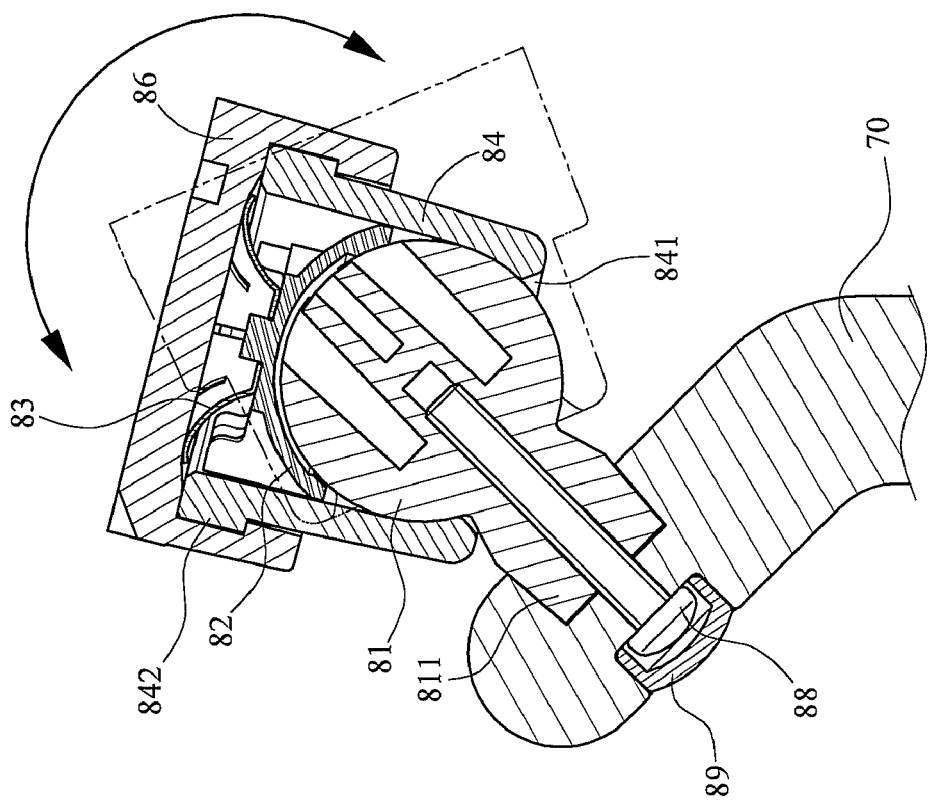
FIG. 7 is a view similar to FIG. 6 showing a pivotal operation of the seat assembly.
Figure 6:
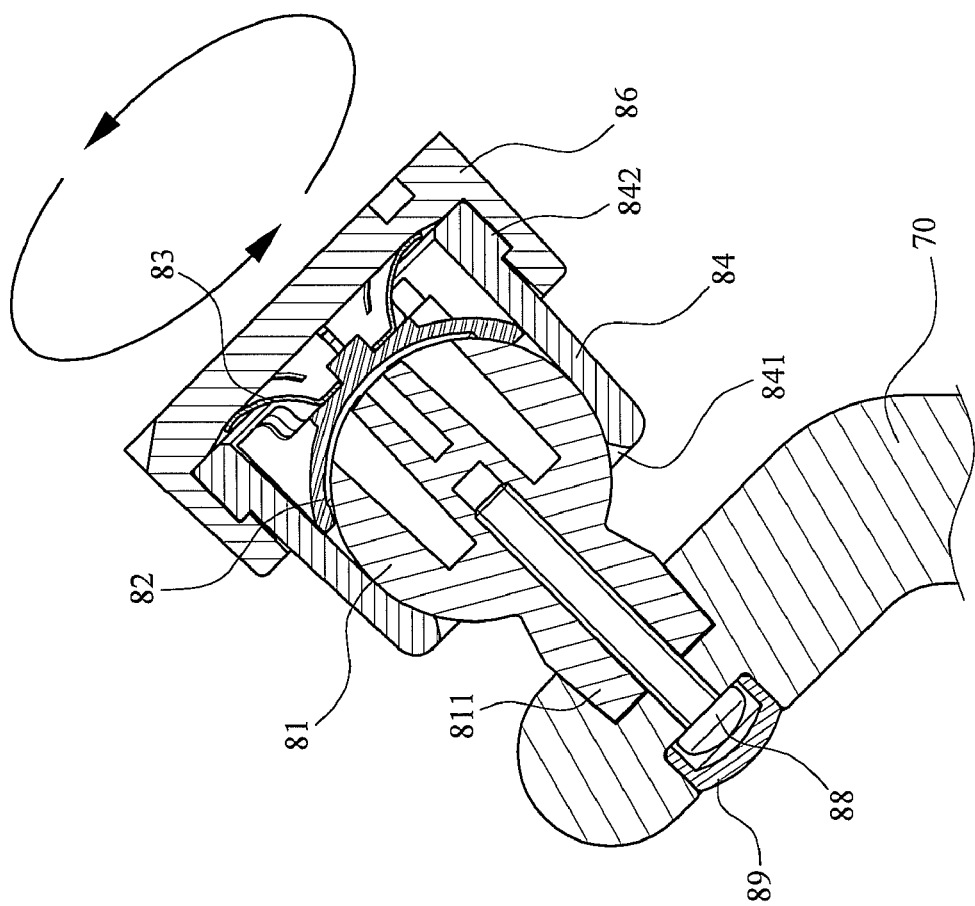
FIG. 6 is an enlarged view of the seat assembly of FIG. 5.

As shown in FIGS. 6 and 7, an individual may rotate the cage 84 relative to the ball 81 to dispose the seat 86 in one desired orientation.

Figure 8:
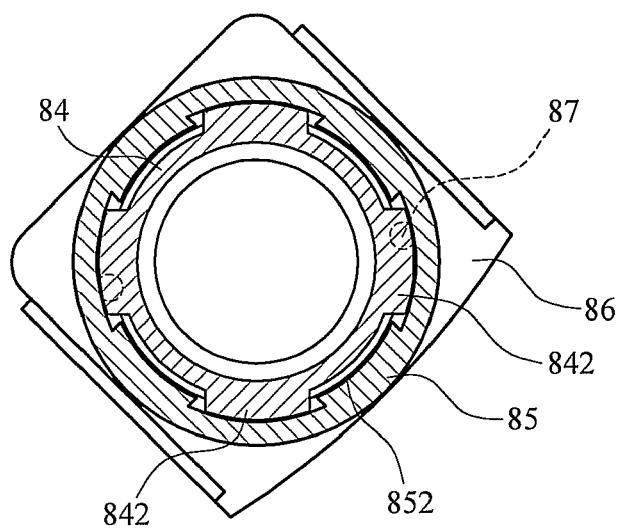
FIG. 8 is a top plan view in part section of the seat assembly of FIG. 6.
Figure 9:
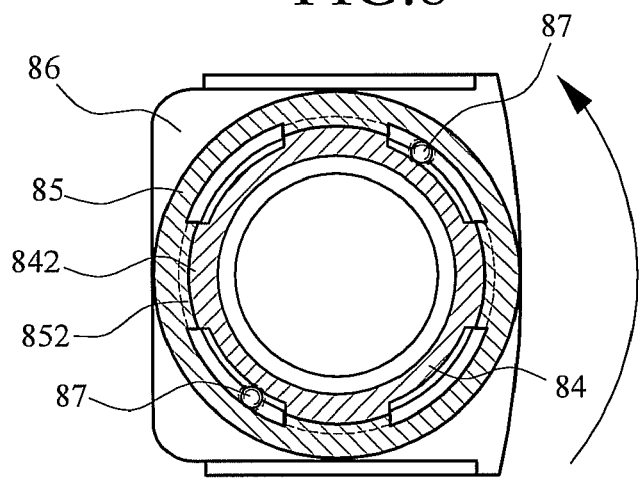
FIG. 9 is a view similar to FIG. 8 showing the caged being rotated.
Figure 10:
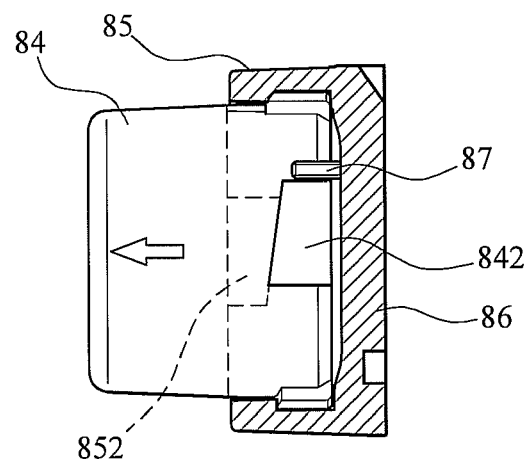
FIG. 10 is a longitudinal sectional view of the seat assembly of FIG. 9.
Figure 12:
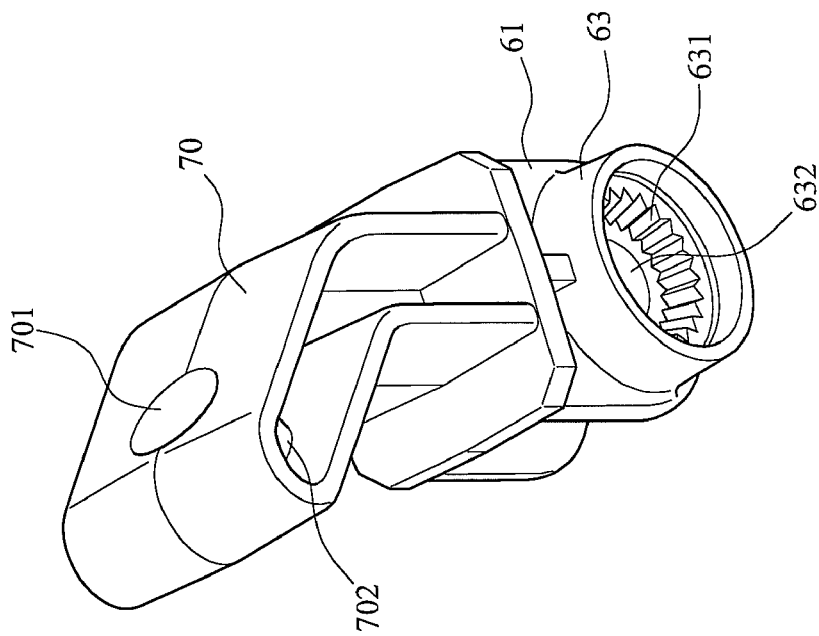
FIG. 12 is a perspective view of the arm and the pivot section.

As shown in FIGS. 8 to 10, the tabs 842 are lockingly engaged with the tabs 852 with the help of the screws 87 by passing the tabs 842 through the gaps 853 (see FIG. 4) and then turning the cage 84 in one direction as indicated by arrow. As an end, the cage 84 and the cylinder 85 are releasably secured together. It is understood that a reverse turning of the cage 84 can detach the cage 84 from the cylinder 85. The provision of the flexible bowl member 82 can absorb the turning force so as to smooth the operation.

Figure 11:
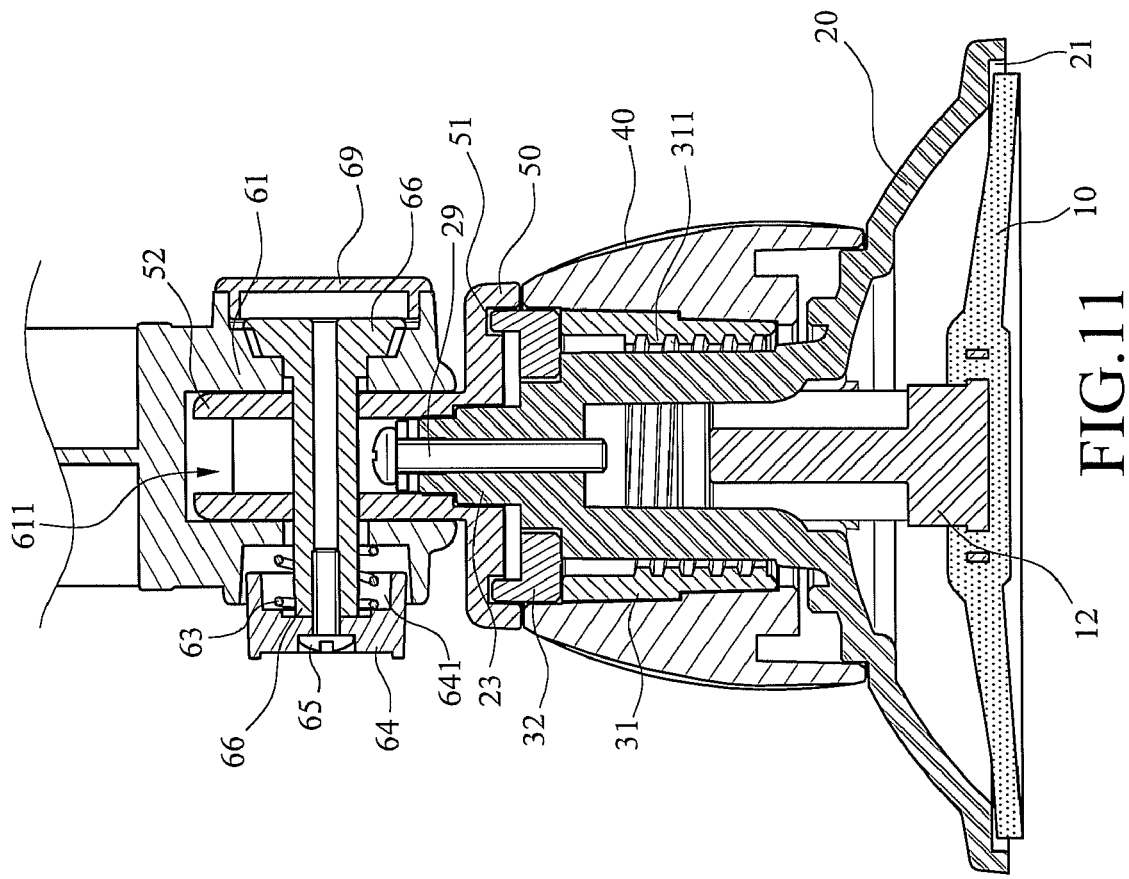
FIG. 11 is a fragmentary sectional view of the lower portion of the holder shown in FIG. 5 on a large scale and being viewed by turning about 90 degrees.
Figures 13, 13A:
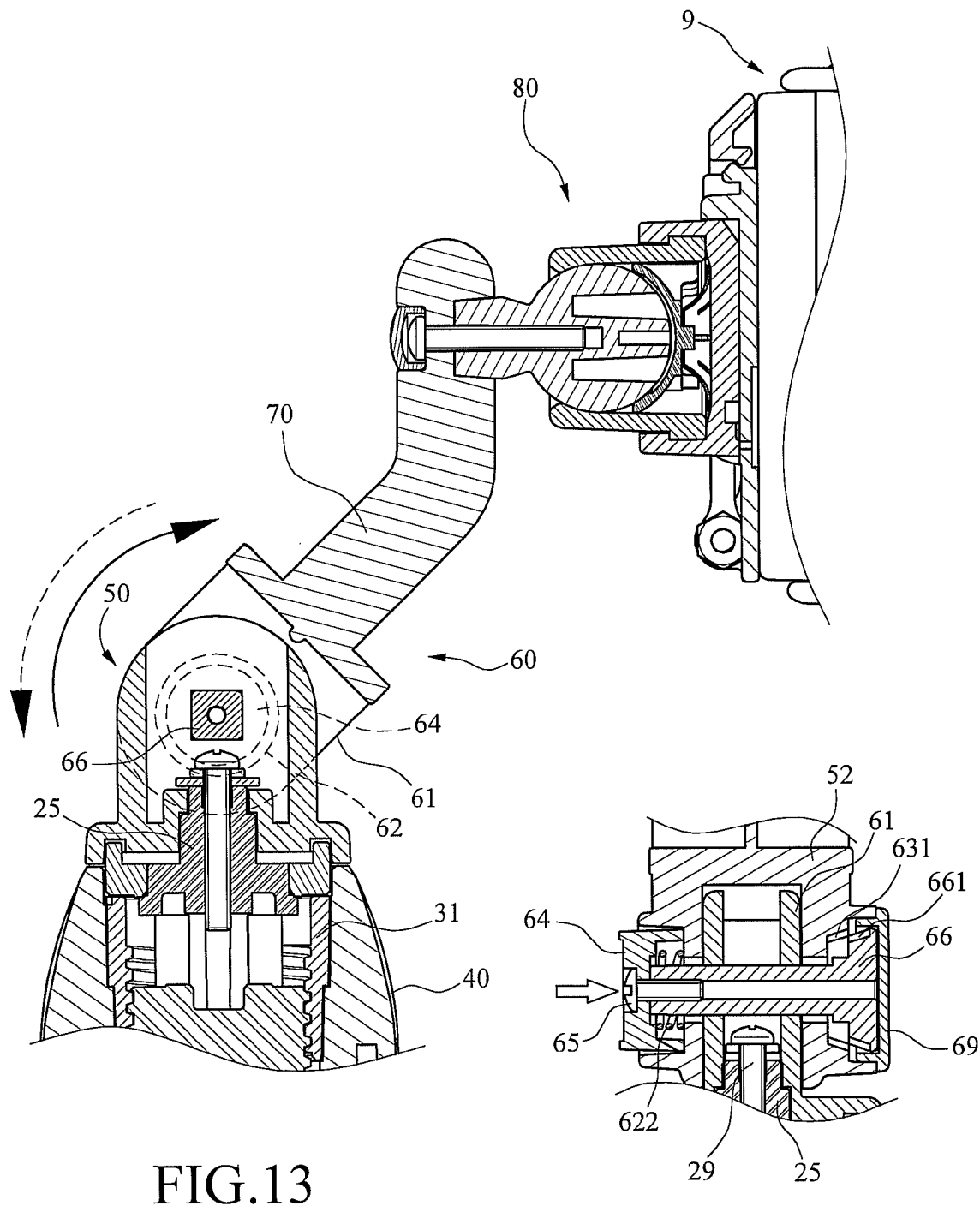
FIG. 13 is a fragmentary sectional view of the upper portion of the holder shown in FIG. 5 on a large scale and being viewed by turning about 90 degrees for showing a pivotal operation of the arm.
FIG. 13A is a fragmentary sectional view of the pivot section shown in FIG. 11 on a large scale showing a spring compression operation thereof.
Figure 16:
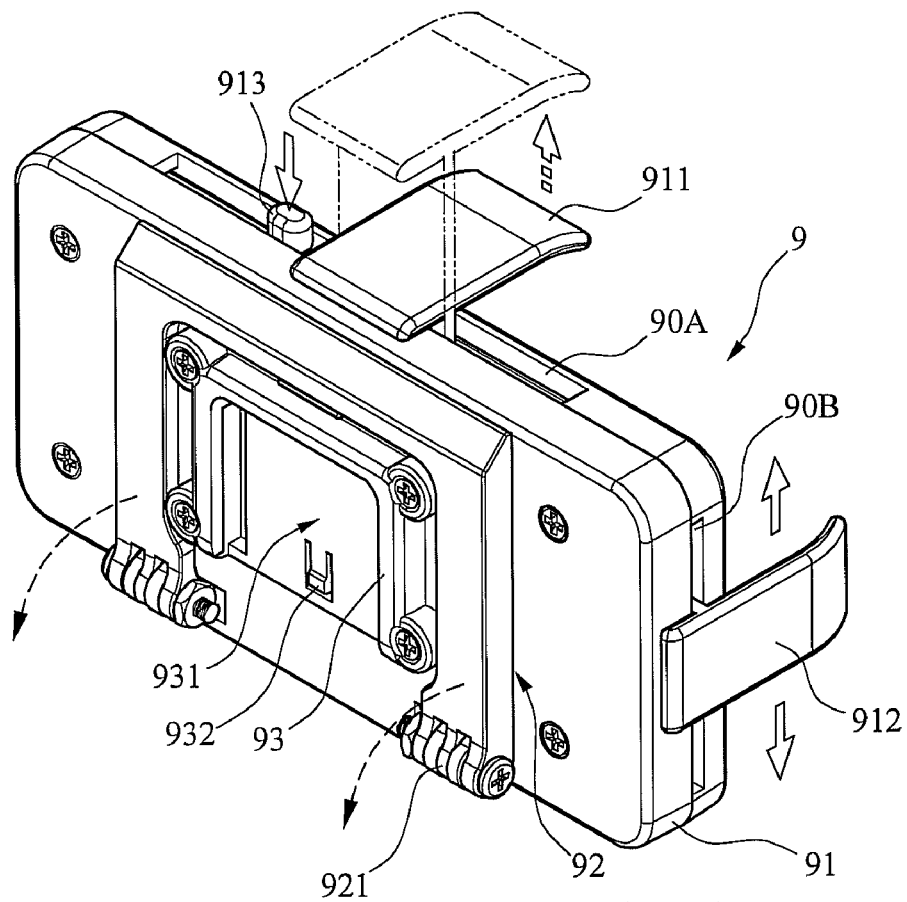
FIG. 16 is a perspective view of the mounting assembly.
Figure 17:
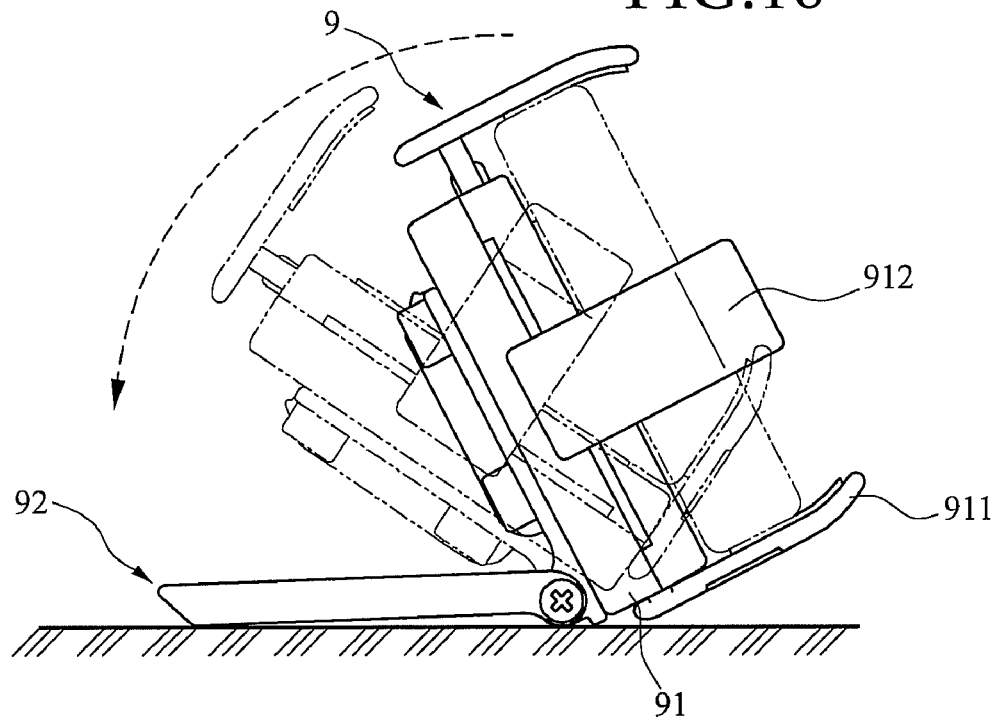
FIG. 17 is a side elevation of the mounting assembly showing a pivotal operation thereof.
Figures 18, 19:
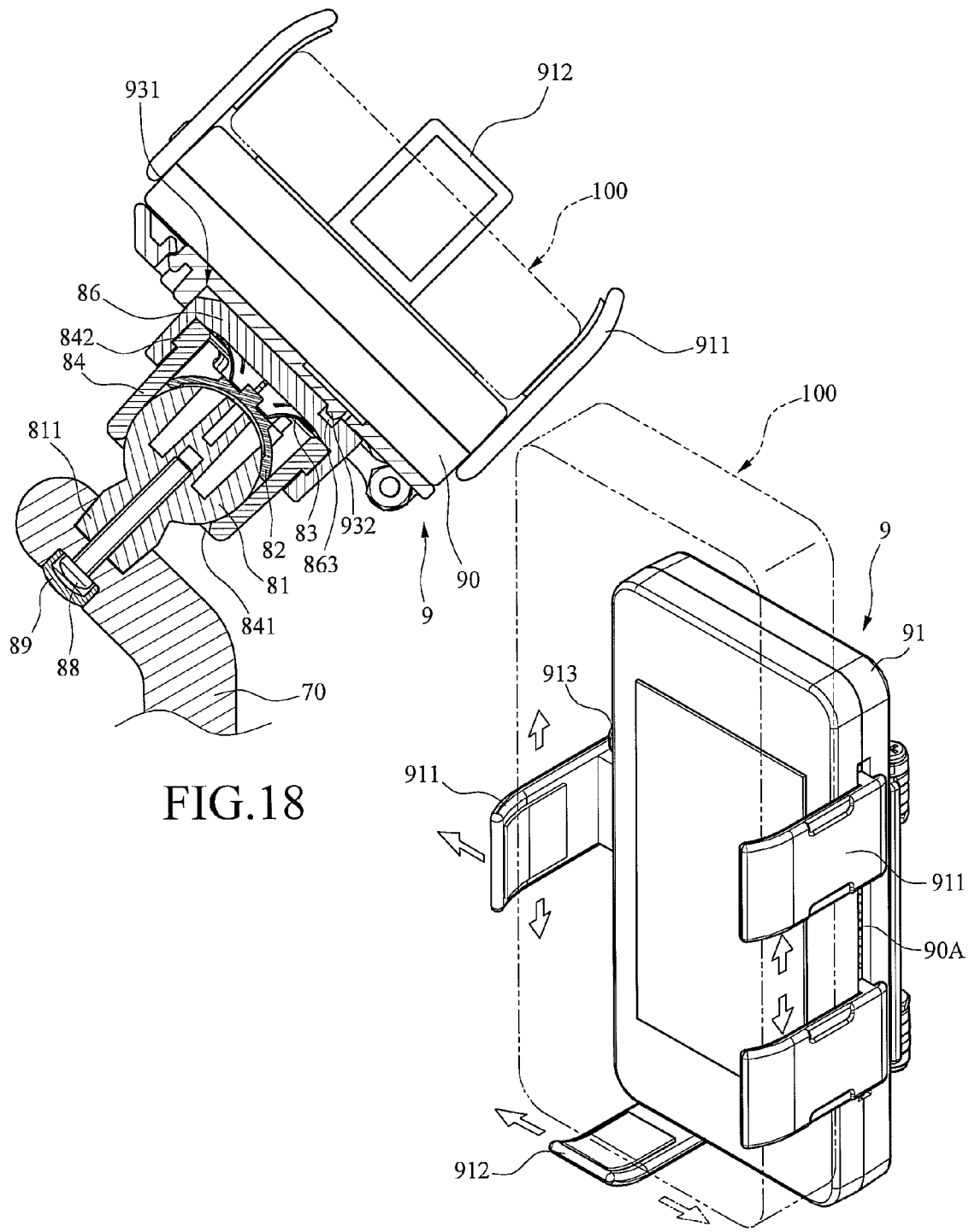
FIG. 18 is a side elevation in part section showing the mounting assembly mounted on the upper portion of the holder.
FIG. 19 is a perspective view of the mounting assembly with an article shown in phantom being secured thereto.

As shown in FIG. 11, the pivot mechanism 60 is prevented from pivoting about the coupling mechanism 50 because the toothed section 661 is in mesh with the toothed section 631. As shown in FIG. 13A, for adjusting an angle of the pivot mechanism 60 an individual may press the push button 64 until the toothed section 661 is disengaged from the toothed section 631. Thereafter, the individual may pivot the pivot mechanism 60 about the coupling mechanism 50 to adjust the angle of the arm 70.

As shown in FIG. 14, an individual may turning the sleeve 40 clockwise as indicated by arrow to create vacuum between the plate 10 and a mounting surface due to the threaded engagement of the internal threaded section 311 and the outer threads 15. Thereafter, the individual may detach the holder from the mounting surface by pulling the tab 11.

As shown in FIG. 15, to the contrary an individual may turning the sleeve 40 counterclockwise as indicated by arrow 5 to reduce the vacuum to a minimum. As a result, the holder is immovably and captively retained on the mounting surface.

While the invention herein disclosed has been described by means of specific embodiments, numerous modifications and variations could be made thereto by those skilled in the art without departing from the scope and spirit of the invention set forth in the claims.

What is claimed is:

1. A holder comprising:
 a suction cup (1) comprising a circular plate (10) formed of resilient material and a rigid bell (20) wherein the plate (10) comprises a central coupling member (12) including outer threads (15), and the bell (20) comprises a hollow cylinder (23) including two opposite openings (231) with the outer threads (15) disposed threat;
 a manipulation assembly (3) comprising a tube (31) including an internal threaded section (311) threadedly secured to the outer threads (15), a sleeve (40) securely put on the tube (31), and a coupling mechanism (50) seated upon the sleeve (40); and
 a pivot assembly (5) comprising a pivot mechanism (60) pivotably secured to the coupling mechanism (50), an arm (70) extended upward from the pivot mechanism (60), and a seat assembly (80) rotatably, pivotably secured to the arm (70).

2. The holder of claim 1, wherein the coupling member (12) further comprises two side grooves (13) and a top recess (14); and wherein the bell (20) further comprises an annular first shoulder (22) intermediate the cylinder (23) and the periphery, a platform (25) on the top of the cylinder (23), an annular second shoulder (26) between the cylinder (23) and the platform (25), two opposite cuts (27) on the periphery of the platform (25), and a top head (28) having an annular third shoulder (281) and an axial threaded hole (282) so that the bell (20) is adapted to secure to the coupling mechanism (50) by driving a first fastener (29) through the coupling mechanism (50) into the threaded hole (282).

3. The holder of claim 2, wherein the manipulation assembly (3) further comprises a ring (32) including two opposite protrusions (322) and a plurality of top projections (323); the tube (31) further comprises a plurality of troughs (312) on a lower portion of the outer surface and a longitudinal groove (313) on an upper portion of the outer surface; the sleeve (40) comprises an annular member (44) on the bottom adapted to rest upon the first shoulder (22), an upper protuberance (42) adapted to matingly engage with the groove (313), and a plurality of risers (41) on the inner surface below the protuberance (42); and the coupling mechanism (50) comprises a plurality of cavities (51) around the bottom, a central opening (53), and a hollow coupling member (52) projecting out of the top and including a channel (54) being in communication with the opening (53), two side openings (55) of a predetermined section being in communication with the channel (54), and a curved top (56).

4. The holder of claim 3, wherein the pivot mechanism (60) comprises:
 a pivot section (61) comprising an axial cut (611) matingly put on the coupling member (52) with the openings (55) aligned with a first and a second holes (621, 632), a first well (62) on one side, and a second well (63) on an other side wherein the first hole (621) is formed in the first well (62), the second hole (632) is formed in the second well (63) and is in communication with the first hole (621) through a cut (611), and an annular first toothed section (631) is formed in the second well (63);
 a pin member (66) comprising a shank (662) of a predetermined section, an axial threaded hole (663) in the shank (662), and a second toothed section (661) around a head thereof; and
 a biasing member (622) put on the shank (662) and exposed in the first well (62), a push button (64), and a second fastener (65);
 wherein the pin member (66) is inserted through the second well (63), the cut (611), and the first well (62) to project out of the first well (62) with the second toothed section (661) being in mesh with the first toothed section (631) so that the second fastener (65) is adapted to drive through the push button (64) into a threaded hole (663) to secure the push button (64) to the pin member (66), make the push button (64) to be spring depressible, and prevent the shank (662) from corotating with the openings (55).

5. The holder of claim 1, wherein the seat assembly (80) comprises:
 a rotatable ball (81) having a projection (811) fastened in the arm (70);
 a bowl member (82) comprising a concave surface (821) matingly engaged with the ball (81), a plurality of slits (824) for dividing the concave surface (821) into a plurality of flexible sections, a recessed portion (822) on a surface opposite the concave surface (821), and a central stud (823) on the recessed portion (822);
 a cup member (83) comprising a central hole (832) securely put on the stud (823), and a plurality of slits (831) for dividing the cup member (83) into a plurality of flexible sections;
 a cylindrical cage (84) comprising an internal space (841) for rotatably receiving the ball (81), an annular flange (845) of reduced diameter on one end for preventing the ball (81) from removing therefrom, a plurality of trapezoidal first tabs (842) around the other end, and a plurality of first gaps (843) each formed between two adjacent first tabs (842);
 a cylindrical member (85) comprising an axial space (851), a plurality of trapezoidal first tabs (852) around the inner surface at one end, and a plurality of second gaps (853) each formed between two adjacent second tabs (852); and
 a seat (86) comprising a slot (863) on a surface opposing the cylindrical member (85), a plurality of threaded holes (861), and a plurality of third fasteners (87) driven through the threaded holes (861) into the space (851) for fastening the seat (86) and the cylindrical member (85) together;
 wherein the first tabs (842) are adapted to lockingly engage with the second tabs (852) by passing through the second gaps (853) and turning the cage (84) in a predetermined direction.

6. The holder of claim 5, further comprising a rectangular mounting assembly (9) comprising:

a plate (91) including a first sliding-grooves (90A) on either longer side, and a second sliding groove (90B) on one shorter side;

a plurality of first clamping arms (911) wherein one first clamping arm (911) is slidably disposed in one first sliding groove (90A) and the remaining one or ones of the first clamping arms (911) are slidably disposed in the other first sliding grooves (90A);

a push button (913) disposed in one first sliding groove (90A) adjacent one first clamping arm (911) so that a pressing of the push button (913) will extend one first clamping arm (911) away from the plate (91);

a second clamping arm (912) slidably disposed in the second sliding groove (90B);

a spring biased U-shaped member (92) hingedly secured to one longer side of the plate (91); and a positioning member (93) disposed on one surface of the plate (91) with the U-shaped member (92) being surrounded, the positioning member (93) having a latch (932) adapted to releasably secure to the slot (863).

\* \* \* \* \*